United States Patent
Schoendube et al.

(10) Patent No.: US 10,871,437 B2
(45) Date of Patent: Dec. 22, 2020

(54) APPARATUS AND METHOD FOR DISPENSING PARTICLES IN FREE-FLYING DROPS ALIGNED USING AN ACOUSTIC FIELD

(71) Applicant: cytena GmbH, Freiburg (DE)

(72) Inventors: Jonas Schoendube, Freiburg (DE); Ivo Leibacher, Zurich (CH)

(73) Assignee: cytena GmbH, Freiburg (DE)

( * ) Notice: Subject to any disclaimer, the term of this patent is extended or adjusted under 35 U.S.C. 154(b) by 414 days.

(21) Appl. No.: 15/674,446

(22) Filed: Aug. 10, 2017

(65) Prior Publication Data

US 2017/0343465 A1 Nov. 30, 2017

Related U.S. Application Data

(63) Continuation of application No. PCT/EP2016/052849, filed on Feb. 10, 2016.

(30) Foreign Application Priority Data

Feb. 12, 2015 (DE) .................. 10 2015 202 574

(51) Int. Cl.
*G01N 15/14* (2006.01)
*G01N 15/00* (2006.01)
*G01N 15/10* (2006.01)

(52) U.S. Cl.
CPC . *G01N 15/1404* (2013.01); *G01N 2015/0065* (2013.01); *G01N 2015/1006* (2013.01);
(Continued)

(58) Field of Classification Search
None
See application file for complete search history.

(56) References Cited

U.S. PATENT DOCUMENTS

| | | | |
|---|---|---|---|
| 3,380,584 A | | 4/1968 | Fulwyler |
| 4,055,491 A | * | 10/1977 | Porath-Furedi ...... B01D 21/283 210/738 |

(Continued)

FOREIGN PATENT DOCUMENTS

| | | |
|---|---|---|
| CN | 1147214 A | 4/1997 |
| CN | 101258033 A | 9/2008 |

(Continued)

OTHER PUBLICATIONS

Laurell, Thomas et al., "Chip Integrated Strategies for Acoustic Separation and Manipulation of Cells and Particles", Chemical Society Review 36 (3), 492-506, 492-506.

(Continued)

*Primary Examiner* — Jill A Warden
*Assistant Examiner* — Brittany I Fisher
(74) *Attorney, Agent, or Firm* — Michael A. Glenn; Perkins Coie LLP

(57) ABSTRACT

An apparatus for dispensing particles in free-flying liquid drops includes a fluid chamber fluidically coupled to a nozzle, a sound source configured to generate, in the fluid chamber, an acoustic field by which particles in a liquid in the fluid chamber may be aligned in an arrangement, and a drop-on-demand mechanism configured to, at a selected point in time, selectively dispense from the nozzle an individual liquid drop containing one or several particles.

12 Claims, 3 Drawing Sheets

(52) U.S. Cl.
CPC .......... *G01N 2015/142* (2013.01); *G01N 2015/1406* (2013.01); *G01N 2015/149* (2013.01)

(56) References Cited

U.S. PATENT DOCUMENTS

| | | | | |
|---|---|---|---|---|
| 4,280,823 | A | * | 7/1981 | Szonntagh ......... B01D 15/3866 209/1 |
| 4,523,682 | A | * | 6/1985 | Barmatz ............. B01D 21/283 181/0.5 |
| 4,673,512 | A | | 6/1987 | Schram |
| 5,085,783 | A | * | 2/1992 | Feke .................... B01D 21/283 210/243 |
| 8,679,338 | B2 | * | 3/2014 | Rietman ................ B01D 61/00 210/192 |
| 2004/0089825 | A1 | | 5/2004 | Schwenke et al. |
| 2006/0021437 | A1 | | 2/2006 | Kaduchak |
| 2006/0034733 | A1 | | 2/2006 | Ferren et al. |
| 2008/0245745 | A1 | * | 10/2008 | Ward ................... G01N 1/4077 209/590 |
| 2009/0021567 | A1 | | 1/2009 | Gao et al. |
| 2009/0029870 | A1 | * | 1/2009 | Ward ................... G01N 15/1404 506/9 |
| 2009/0139332 | A1 | | 6/2009 | Goddard et al. |
| 2009/0225112 | A1 | | 9/2009 | Barbet |
| 2009/0316151 | A1 | * | 12/2009 | Matula ............... G01N 15/1459 356/338 |
| 2010/0009333 | A1 | * | 1/2010 | Auer ...................... C12N 13/00 435/2 |
| 2011/0111497 | A1 | * | 5/2011 | Tamai ................... C12M 45/09 435/366 |
| 2011/0187778 | A1 | | 8/2011 | Boot et al. |
| 2012/0160746 | A1 | * | 6/2012 | Thorslund ......... B01L 3/502761 209/552 |
| 2012/0225475 | A1 | * | 9/2012 | Wagner ................. G01N 15/14 435/288.7 |
| 2012/0298564 | A1 | | 11/2012 | Kaduchak et al. |
| 2013/0043170 | A1 | * | 2/2013 | Rose .................... B01D 21/283 209/659 |
| 2013/0048565 | A1 | * | 2/2013 | Fiering ............... A61M 1/3693 210/660 |
| 2013/0095469 | A1 | * | 4/2013 | Koltay ............... G01N 15/1404 435/3 |
| 2013/0270287 | A1 | | 10/2013 | Patt et al. |
| 2013/0284271 | A1 | * | 10/2013 | Lipkens ................. B01D 43/00 137/1 |
| 2014/0011240 | A1 | * | 1/2014 | Lipkens ................. B01D 21/28 435/71.1 |
| 2014/0051064 | A1 | * | 2/2014 | van den Engh ....... C12M 47/04 435/3 |
| 2014/0306122 | A1 | * | 10/2014 | Norton .................. G01N 15/14 250/428 |
| 2014/0377834 | A1 | * | 12/2014 | Presz, Jr. ............... C12M 47/02 435/173.9 |

FOREIGN PATENT DOCUMENTS

| | | |
|---|---|---|
| CN | 101855089 A | 10/2010 |
| CN | 104321634 A | 1/2015 |
| DE | 1517961 A | 1/1970 |
| DE | 10241545 A1 | 3/2004 |
| EP | 0421406 A2 | 4/1991 |
| JP | 2008508520 A | 3/2008 |
| JP | 6150655 B2 | 8/2013 |
| KR | 20120030421 A | 3/2012 |
| WO | 2009023459 A1 | 2/2009 |
| WO | 2011154042 A1 | 12/2011 |
| WO | 2013003498 A2 | 1/2013 |

OTHER PUBLICATIONS

Leibacher, Ivo et al., "Impedance Matched Channel Walls in Acoustofluidic Systems", Lab A Chip 14 (3), 2014, 463-470.

Mandralis, Zenon I. et al., "Fractionation of Suspensions Using Synchronized Ultrasonic and Flow Fields", AIChE Journal 39 (2), 1993, 197-206.

Nakamura, Makoto et al., "Biocompatible Inkjet Printing Technique for Designed Seeding of Individual Living Cells", Tissue Engineering 11(11-12), 2005, 1658-1666.

Yamaguchi, Shuichi et al., "Cell Patterning Through Inkjet Printing of One Cell Per Droplet", Biofabrication 4 (4), 2012, 0-8.

Yusof, Azmi et al., "Inkjet-Like Printing of Single-Cells", Lab on a Chip 11 (14), 2011, 2447-2454.

\* cited by examiner ent types are known in this respect. For example, technical methods for handling are acoustophoresis, electrophoresis and hydrodynamics.

APPARATUS AND METHOD FOR DISPENSING PARTICLES IN FREE-FLYING DROPS ALIGNED USING AN ACOUSTIC FIELD

CROSS-REFERENCE TO RELATED APPLICATIONS

This application is a continuation of copending International Application No. PCT/EP2016/052849, filed Feb. 10, 2016, which is incorporated herein by reference in its entirety, and additionally claims priority from German Application No. 102015202574.8, filed Feb. 12, 2015, which is incorporated herein by reference in its entirety.

The present invention relates to apparatuses and methods for dispensing particles in free-flying liquid drops and, in particular, to apparatuses and methods for dispensing particles in free-flying liquid drops using a drop-on-demand mechanism.

BACKGROUND OF THE INVENTION

Cells and other micro particles may either be handled or analyzed by free-jet printing methods or in closed fluidics. In this case, the term "particle" is to be understood as a general term including both solid organic or inorganic micro particles and biological cells.

In free-jet printing methods, a distinction may be made between dispensing systems with a sensor technology comprising sensors for recognizing the particles/cells and such dispensing systems operating without a sensor. Systems operating without a sensor allow neither for a control of the amount of dispensed particles nor for an analysis of these particles. In dispenser systems, or particle dispensers, with a sensor technology, a distinction may be made between so called drop-on-demand dispensers and continuous-jet dispensers. Drop-on-demand dispensers typically allow for a higher level of control, while continuous-jet dispensers typically comprise a higher throughput.

A dispenser, or drop generator, is generally understood to be an apparatus for dispensing amounts of a liquid in the form of free-flying drops. A drop-on-demand technology, or a drop-on-demand mechanism, is generally understood to be a technology, or a mechanism, in which, at a selected point in time, individual drops are selectively generated from a nozzle. In other words, each individual drop is generated on demand (on instruction) using a separate driving signal. In contrast to the drop-on-demand printing technology, in the continuous-jet printing technology, a thin liquid jet is dispensed from a nozzle in a pressure-driven manner, wherein the liquid jet disintegrates after exiting the nozzle in individual drops which, for example, may be electrostatically deflected. Thus, in the continuous-jet printing technology, a separate driving signal is not provided for each individual drop, and the induvial drops may not be selectively generated at a selected point in time.

The term acoustic radiation force is understood to be the time-weighted average of the force which an object experiences upon impingement of a sound field. Acoustophoretics, or acoustophoresis, is understood to be a movement of particles in suspensions generated by sound waves, or their selective handling or manipulation, for the purpose of a defined movement or arrangement generated by a defined impingement of sound waves. Further, in this case, an observation volume is understood to be a defined two-dimensional grid or a volume area in which measurements or observations may be carried out. In this case, handling particles is understood to be, for example, deflecting or arranging particles inside of chambers or channels, for example, micro chambers or micro channels, wherein different types are known in this respect. For example, technical methods for handling are acoustophoresis, electrophoresis and hydrodynamics.

In the conventional technology, biocompatible printing heads are known which, for example, allow for printing living cells, e.g., see Nakamura et al., "Biocompatible inkjet printing technique for designed seeding of individual living cells", Tissue Engineering (2005), 11(11-12), pages 1658-1666. Depending on the concentration, individual cells may be printed. However, there is no sensor technology for detecting the particles/cells. Yusof et al., "Inkjet-like printing of single-cell", Lab on a Chip (2011), 11(14), pages 2447-2454, describe a print head comprising an optical cell recognition, however, in this case, the cells are arbitrarily arranged in the dosage chamber. Even in a comparable arrangement, as described in Yamaguchi et al., "Cell patterning though inkjet printing one cell per droplet", Biofabrication (2012), 4(4), the particles are uniformly distributed in the nozzle.

Furthermore, August Kund has already described in the 19th century that a uniform arrangement of particles in a fluid may be caused by sound waves, see "Annalen der Physik and Chemie, Band CXXVII, Nr. 4, 1866. Mandralis et al., "Fractionation of suspension using synchronized ultrasonic and flow fields", AIChE Journal (1993), 39(2), pages 197-206, describe the application of this effect on micro particles in small. Furthermore, T. Laurell et al., "Chip integrated strategies for acoustic separation and manipulation of cells and particles", Chemical Society Reviews (2007), 36(3), pages 492-506, describe the handling, or manipulation, of cells in micro fluidic structures by means of acoustophoresis and show different possible arrangements under conditions of a continuous flow.

I. Leibacher et al., "Impedance matched channel walls in acoustofluidic systems", Lab on a chip (2014), 14(3), pages 463-470, describes fundamentals on how particles may be manipulated in a micro fluidic system using standing sound waves.

Flow cytometry, for example, FACS (=Fluorescence-Activated Cell Sorting) is understood to be a measurement method allowing for the analysis of cells which individually fly past an electrical voltage or a light ray with a high speed. For example, a method of flow cytometry is known from U.S. Pat. No. 3,380,584. Typically, a continuous-jet printing method is employed in the flow cytometry. This has the disadvantage that drops are continuously generated, while it is not possible to discontinue the drop stream in a controlled manner. Thus, in a selective sorting of particles including cells by means of this technique, the drops have to be deposited at different positions according to content. This is caused by electrostatic deflection in flight. The higher the number of positions and the useful deposition accuracy (e.g., in microtiter plates with 96 or 384 wells), the harder and more technically elaborate the process.

EP 0421 406 A2 describes a thermal inkjet printing head for dispensing particles. The particles are arbitrarily arranged in a reservoir and are analyzed by means of a detector in flight not until ejection.

WO 2013/003498 A2 describes a method of flow cytometry in which acoustically focused particles including cells flow through a measurement area, wherein an optical readout of a qualitative parameter and quantitative parameter of this particle occurs in order to characterize the same.

US 2012/0298564 A1 describes a method for acoustically handling one or several particles in order to position the particles more accurately in the channel for better sensor results.

WO 2011/154042 A1 describes apparatuses and methods for dispensing particles/cells contained in a free-flying droplet. A dispenser with a drop-on-demand generator is provided by which drops containing particles may be ejected from an opening. According to this specification, the particles are focused in a hydrodynamic or dielectric manner in the drop-on-demand dispenser.

SUMMARY

According to an embodiment, an apparatus for dispensing particles in free-flying liquid drops may have: a fluid chamber fluidically coupled to a nozzle; a sound source configured to generate, in the fluid chamber, an acoustic field by which particles in a liquid in the fluid chamber may be aligned in an arrangement; and a drop-on-demand mechanism configured to, at a selected point in time, selectively dispense from the nozzle an individual liquid drop containing one or several particles, wherein the drop-on-demand mechanism is configured to move the particles towards the nozzle in a step-by-step manner, wherein the sound source is configured to switch between a mode in which the acoustic field is generated with a first frequency so that the particles are aligned along at least one line in parallel to the movement direction, and a second mode in which the acoustic field is generated with a second frequency so that the particles are aligned along at least one line perpendicular to the movement direction and held in the fluid chamber.

According to another embodiment, a method for dispensing particles in free-flying liquid drops may have the steps of: generating an acoustic field in a fluid chamber fluidically coupled to a nozzle in order to align particles in a liquid in the fluid chamber in an arrangement; and applying a drop-on-demand mechanism configured to, at a selected point in time, selectively dispense an individual drop from the nozzle in order to eject from the nozzle a free-flying liquid drop containing one or several particles, wherein, by applying the drop-on-demand mechanism, the particles are moved towards the nozzle in a step-by-step manner, switching between a mode in which the acoustic field is generated with a first frequency so that the particles are aligned along at least one line in parallel to the movement direction, and a mode in which the acoustic field is generated with a second frequency so that the particles are aligned along at least one line perpendicular to the movement direction and held in the fluid chamber.

Embodiments of the invention provide an apparatus for dispensing particles in free-flying liquid drops, comprising:

a fluid chamber fluidically coupled to a nozzle;

a sound source configured to, in the fluid chamber, generate an acoustic field by which particles in a liquid in the fluid chamber may be aligned in an arrangement; and a drop-on-demand mechanism configured to, at a selected point in time, selectively dispense from the nozzle an individual liquid drop containing one or several particles.

Embodiments of the invention provide a method for dispensing particles in a free-flying liquid drop, comprising:

generating an acoustic field in a fluid chamber fluidically coupled to a nozzle in order to align particles in a liquid in the fluid chamber in an arrangement; and applying a drop-on-demand mechanism configured to, at a selected point in time, selectively dispense from the nozzle an individual drop in order to eject from the nozzle a free-flying liquid drop containing one or several particles.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
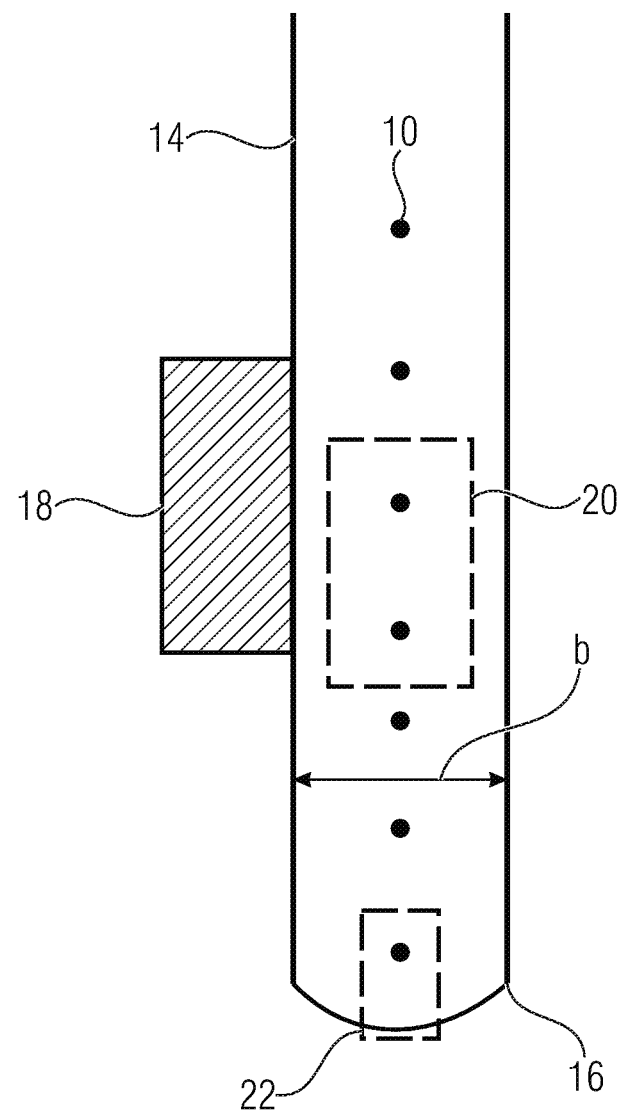
FIG. 1 schematically shows an embodiment of an apparatus for dispensing particles in free-flying liquid drops.
Figure 1:
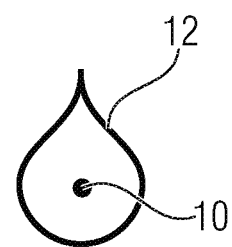

Embodiments of the invention are based on dispensing particle-carrying liquids, wherein particles in the liquid are understood to be non-solvable objects which do not only include solid body particles but, in particular, also living cells, gel particles, oil drops or particles filled with a liquid. For example, the liquid may be a buffer suspension containing living cells. Particles are dispensed in free-flying liquid drops using a drop-on-demand mechanisms, wherein the particles are aligned, or focused, using an acoustic field. In particular, embodiments of the invention are based on the findings that it is possible, using acoustophoretic methods, to sort the particles within the liquid and to supply the same to the nozzle of the dispenser in an orderly manner. Thus, embodiments of the invention allow for using technologies of microactor systems which enable the generation of sound waves in order to cause a corresponding acoustic field in the fluid chamber. In embodiments, the particles may be brought to the center of the fluid chamber which may comprise the shape of a channel, where the speed distribution is more uniform and, thus, the particles proceed in a more predictable manner. Further, the aligned particles may be better sensed since the same are separated from interference effects, such as a switch-off, in the edge areas of the liquid-carrying structures, i.e., the fluid chamber.

In embodiments, the apparatus may be equipped with a sensor in order to selectively dispense certain particles or a certain number of particles. The sound source may be configured to generate an acoustic field by which the particles are arranged in volume of interest. In this case, the sensor only has to monitor a smaller region of interest (ROI, volume of interest), i.e., a smaller section of the channel and, thus, may work faster and more efficiently. In embodiments, the sound source, i.e., the acoustic actuator, may be coupled from the outside to the liquid-carrying structure, i.e., the fluid chamber, of the dispenser and does not have to be integrated into the same. This has the advantage that the dispensing apparatus itself does not have to be changed. Thus, manufacturing costs and the complexity of the dispenser may remain unchanged.

Thus, focusing the particles to be dispensed by means of hydrodynamics (e.g., as described in WO 2011/154042 A1) is not needed. Such focusing by means of hydrodynamics comprises several disadvantages in a step-by-step dispensing using a drop-on demand mechanism which may be avoided by using an acoustophoretic focusing. It is not necessary to have several liquid reservoirs, or inlets, so that the problems arising when filling corresponding fluidic structures, in particular, with regard to gas bubble formation may be avoided. Furthermore, the acoustophoresis allows for a more accurate focusing which depends less on production tolerances and, thus, is more robust. Furthermore, it has been found that a dielectric focusing has the disadvantage that electrodes have to be inserted into the dosage chamber which involves a change of the dispenser. However, in embodiments of the invention, the dispenser, i.e., the fluidic structures of the same, does not have to be changed, while the sound source used for focusing may be adjusted or switched off as needed.

Embodiments of the invention are based on the first-time finding that an acoustic focusing in a drop-on-demand dispenser, i.e., a dispenser generating a discrete flow and not a continuous flow, may be implemented. In embodiments of the invention, the fluid chamber comprises the shape of a channel tapering towards a nozzle. It has been found that such a shape is appropriate for an acoustophoresis and provides unexpected advantages. It has been found that different standing sound images may be generated which, besides a focusing of the particle in the center of the fluid chamber, also provide the possibility to maintain particles transverse to the flow direction. The inventors have found that the resting stable meniscus which arises at the nozzle of the drop-on-demand dispenser between the dispensing processes is not affected by the acoustic field in such a way that the same becomes unstable. The combination of drop-on-demand dispenser and acoustophoresis and the advantages achievable thereby were only made possible by this finding.

Compared to techniques for drop-on-demand dispensing particles in which particles in the suspension are arbitrarily distributed, embodiments of the invention significantly reduce the effort to detect particles. By this, the rate and the accuracy of the detection may be increased. Thus, the predictability if a drop contains particles, and if so, how many, may be increased. Thus, embodiments of the invention allow for a more accurate determination of the number of particles and, thus, a higher throughput.

Thus, embodiments of the invention are based on the findings that an acoustophoretic alignment, or focusing, of particles in a dispenser using a drop-on-demand mechanism may be used in an advantageous manner in order to selectively supply individual particles to a nozzle or to selectively hold back particles. Contrary to this, the techniques described in WO 2013/003498 A2 and US 2012/0298564 A1 use acoustic forces to better analyze particles in a continuous flow, however, the arrangements described therein are not able to single particles.

FIG. 1 shows a schematic illustration of an embodiment of an apparatus for dispensing particles 10 in free-flying liquid drops 12. The apparatus comprises a fluid chamber 14 which, in the embodiment shown, comprises the shape of a channel. An upper end of the fluid chamber 14 represents an inlet and a lower end of the fluid chamber 14 represents a nozzle 16 fluidically coupled to the fluid chamber 14. The apparatus comprises a sound source 18 configured to, in the fluid chamber 14, generate an acoustic field by which the particles 10 in a liquid in the fluid chamber 14 may be aligned in an arrangement. Further, the apparatus comprises a drop-on-demand mechanism 20 configured to, at a selected point in time, selectively dispense from the nozzle 16 an individual liquid drop 12 containing a particle 10. The drop-on-demand mechanism may be a piezoelectrically operated mechanism which, for example, comprises a mechanical membrane abutting at the fluid chamber, and a pizeoelectric operating element configured to operate the mechanical membrane in order to reduce a volume of the fluid chamber to eject the free-flying droplet 12 from the nozzle 16. Regarding an example of a drop-on-demand mechanism, reference may be made to the teachings of WO 2011/154042 A1, which is incorporated herein by reference.

For example, the sound source 18 may be formed by a piezo converter configured to generate an acoustic field at the appropriate frequency. The sound source mechanically contacts the fluid chamber and, by this, also the liquid. The excitation frequency of the sound source 18 may be at a resonance frequency of the fluid chamber 14, i.e., $\lambda=2\cdot b/n$ applies with respect to the wavelength, wherein b is the width of the fluid chamber 14 and n is the mode of the oscillation. By this, at the mode n=1, a standing wave may be generated in the fluid chamber 14 by which the particles 10 are aligned centrally in the fluid chamber along a line, as shown in FIG. 1. The particles do not flow continuously but are transported by the on-demand dispensing step-by-step further towards the nozzle 16. The region of interest (ROI), or the volume of interest 22, is located at an appropriate position, e.g., near the nozzle 16. A sensor, or a detector, not shown in FIG. 1, may be provided in order to sense information with regard to if a particle is arranged in the corresponding volume 22. The volume of interest may be a volume which is dispensed from the nozzle with one of the next drops. In embodiments, the volume of interest may be a volume which is ejected in the next dispensing operation.

Thus, in embodiments, the drop-on-demand mechanism may be configured to move the particles towards the nozzle step-by-step, the sound source being configured to generate the acoustic field with a first frequency at which the particles are aligned along at least one line in parallel to the movement direction. Further, the line may be aligned centrally in the fluid chamber towards the nozzle. Chamber walls of the fluid chamber which are transversely opposite to the movement direction, for example, the left and right chamber walls in FIG. 1, may be arranged at a distance to each other corresponding to an integer multiple of half the wavelength of the frequency of the acoustic field. In embodiments of the invention, the fluid chamber may comprise a round or rectangular, e.g., square, flow cross-section in the streaming direction.

Figure 2C:
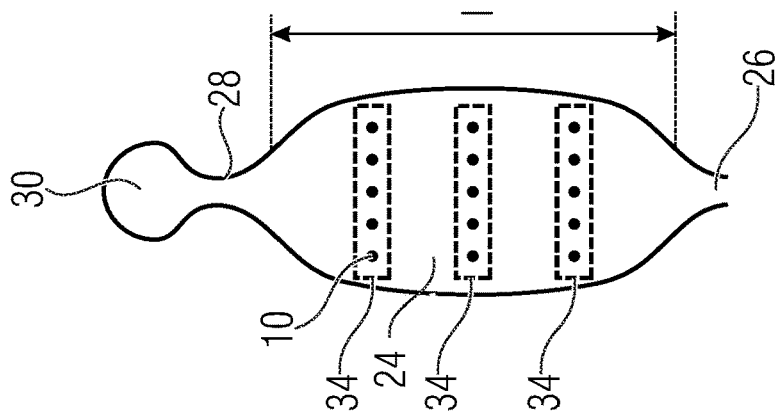
FIG. 2a-2c show schematic illustrations for explaining different particle alignments in a fluid chamber.
Figure 2B:
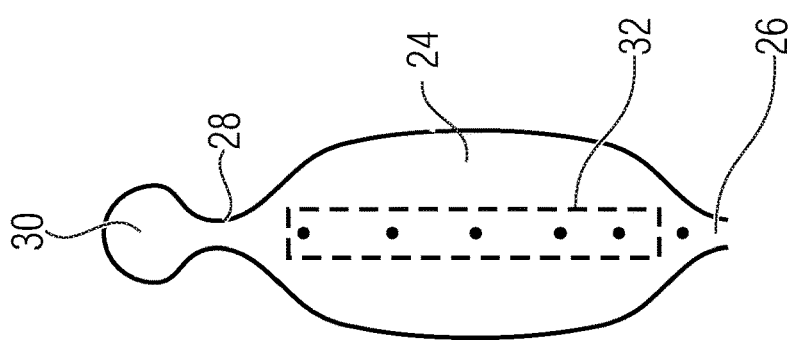
Figure 2A:
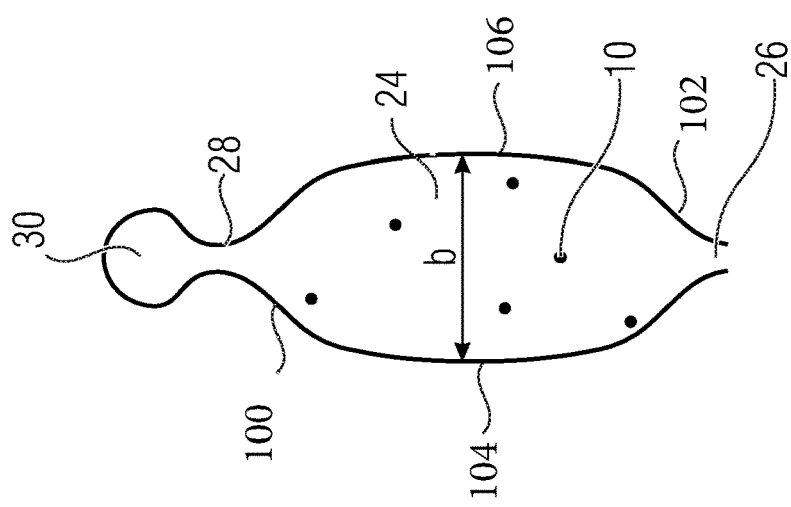

FIG. 2a shows a schematic illustration of a fluid chamber 24 comprising a nozzle 26 and an inlet 28. The inlet 28 may be fluidically coupled to an inlet region 30. The fluid chamber 24 comprises chamber walls 100, 102 opposite in the movement direction and chamber walls 104, 106 transversely opposite to the movement direction. In embodiments of the invention, fluidic structures representing the fluid structures shown in FIG. 2a may be formed in a microchip which, for example, consists of silicon and glass. For example, the fluidic structures including the fluid chamber 24, the nozzle 26 and the inlet 28 may be formed in a silicon substrate and may be covered with a glass plate. A sound source, not shown in FIGS. 2a-2c, is provided by which a resonant sound field may be generated in the fluid chamber 24. As shown in FIG. 2a, the fluid chamber 24 tapers towards the nozzle 26 and ends in the nozzle. Furthermore, the dosage chamber tapers towards the inlet and ends with a fluidic resistance in front of the inlet 28. In this case, sound waves reflect at the interface between the liquid and the material in which the fluid chamber is formed, for example silicon. For example, the liquid may be water or a buffer solution in which particles, which may be cells, are suspended. In the illustration in FIG. 2a, no acoustic field is present, and the particles 10 are arbitrarily arranged in the fluid chamber 24.

In embodiments of the invention, the sound source is configured to generate an acoustic field in the fluid chamber 24 by which the particles moving step-by-step with each drop ejection towards the nozzle 26 are arranged in parallel to the fluid movement. In this case, the frequency of the sound source is selected such that the distance of the silicon walls transverse to the movement direction of the particles is a multiple (an integer multiple) of λ/2, wherein λ is the wavelength of the sound wave in the liquid. In this case, the walls of the fluid chamber are interfaces between the material in which the fluid chamber is formed and the liquid at which an impedance discontinuity occurs. By this, one or several pressure knot lines may be generated in parallel to the fluid movement. In this case, an acoustic focusing may occur in parallel to the fluid movement. The nozzle and the fluid chamber may be arranged such that the main oscillation mode and, thus, the main pressure node line may be centered in the fluid chamber and aligned towards the nozzle. By this, it is possible to move the particles at each drop ejection, i.e., each on-demand operation, towards the nozzle 26 in a defined manner. In FIG. 2b, the corresponding node line of the pressure field is shown by a dotted frame 32.

An excitation case, as described above with reference to FIG. 2b, is particularly advantageous in order to selectively supply particles to the nozzle 26. Further, such an excitation case is advantageous when optical particle recognition is carried out. Particles may be selectively positioned, or focused, in a region of interest. In this case, a shading of particles may be avoided, which may typically occur with non-focused particles in the fluid chamber, or in the channel, when the particles are located at the edge of the fluid chamber or the channel. Further, there is the possibility to design the optical sensory region corresponding to the region of interest in a smaller manner which, furthermore, enables a higher throughput.

Now, a second excitation case is described with reference to FIG. 2c. In the case shown in FIG. 2c, the frequency of the sound source is adapted in order to generate a resonance sound field which is turned by 90 degrees, compared to the sound fields described above. Here, the standing wave is in parallel to the fluid movement direction or, in other words, the knot lines are transverse (i.e., perpendicular) to the fluid movement direction. This is possible due the geometry of the fluid chamber which is configured in a tapered manner both towards the nozzle and also towards the inlet. In other words, the fluid chamber is configured to be tapered at two ends opposite in the stream direction so that standing sound waves may be generated by reflections at the walls formed thereby. Due to a small dimension of the openings of the inlet 28 and the nozzle 26, compared to the chamber width b, it is possible for the openings to hardly comprise any interfering effects on the sound field. Thus, a resonant sound field may be generated which comprises one or several node lines transverse to the fluid movement direction. For example, FIG. 2c shows three such node lines 34. Particles may be held at these node lines. In this case, the frequency is to be selected such that the distance corresponds, in the fluid movement direction of opposite walls of the fluid chamber, i.e., the length l shown in FIG. 2c, to an integer multiple of half the wavelength of the sound wave in the liquid. In embodiments, the dimension of the openings of the nozzle 26 and the inlet 28 may be at most 50% and advantageously less than 25% of the width of the fluid chamber transverse to the fluid movement direction. In embodiments, the width of the openings may be between 10 and 125 μm and the total chamber width may be between 750 μm and 1250 μm. In embodiments, the width of the openings may be 1% to 15%, e.g., 10%, of the chamber width.

With a corresponding excitation, as explained with reference to FIG. 3c, it is possible to hold particles in spite of a fluid movement. By this, a liquid, e.g., a buffer solution, may be dispensed without dispensing particles from the nozzle 26 since the particles are held at the node lines, i.e., the pressure minimums. Thus, a drying of the nozzle may be avoided by occasionally, e.g., periodically, dispensing a liquid without dispensing particles. Thus, embodiments allow for holding particles against a sedimentation which could lead to a clogging of the nozzle. Furthermore, it is possible to switch between dispensing with or without particles as needed, without having to lose particles, by accordingly controlling the sound source. Thus, it is possible to select the dispensed volume and the dispensed number of particles independently from each other.

Thus, embodiments of the invention provide apparatuses and methods in which the drop-on-demand mechanism is configured to move the particles towards the nozzle step-by-step, wherein the sound source is configured to generate the acoustic field with a first frequency at which the particles are aligned along at least one line perpendicular to the movement direction. In such embodiments, the fluid chamber may comprise chamber walls opposite in the movement direction in which the nozzle and an inlet opening are formed, wherein the chamber walls opposite in the movement direction comprise a distance to each other corresponding to an integer multiple of half the wavelength of the second frequency. If, as shown in FIGS. 2a-2c, the fluid chamber comprises chamber walls inclined in this direction, a virtual wall position which, for example, results from a calculated mean value due to the inclined course of the chamber wall may be used in order to determine the corresponding distance.

Figure 3:
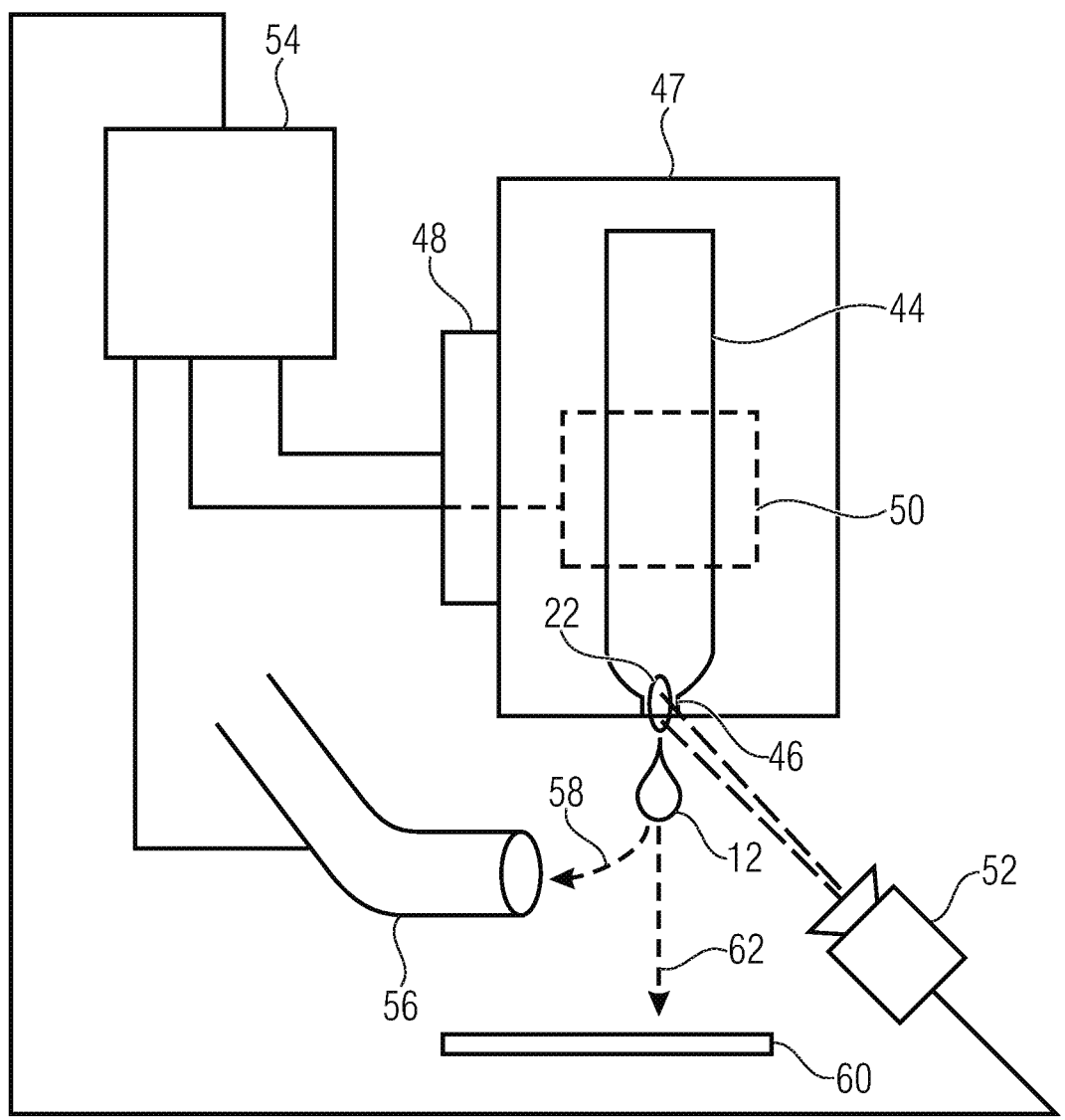
FIG. 3 schematically shows an embodiment of an apparatus for dispensing particles in free-flying liquid drops which comprises a sensor technology.

FIG. 3 shows an embodiment of an apparatus for dispensing particles in free-flying liquid droplets using acoustophoretic focusing and a drop-on-demand mechanism. The apparatus comprises a fluid chamber 44 which may, for example, be formed by the fluid chamber 24 described in the FIGS. 1 and 2a-2c. The fluid chamber 44 is fluidically coupled to a nozzle 46 and may be formed in a dispensing chip 47. A sound source 48 may be directly attached to the dispensing chip 47. Alternatively, the sound source 48 may be attached at a holder (not shown) to which the dispensing chip is attached. For example, the holder may be formed from plastic. A drop-on-demand mechanism 50, which may correspond to the on-demand mechanism 20 described with reference to FIG. 1, is provided in order to, at a selected point in time, selectively dispense from the nozzle 46 an individual liquid drop which may contain a particle. The sound source 48 may be configured to cause arrangements of the particles in the liquid in the fluid chamber 46, as, for example, described above with reference to FIGS. 2a-2c. Provided is a sensor 52 which is configured to sense information with regard to if a particle is arranged in a region of interest 22, for example, a volume dispensed with one of the next drops of the nozzle. The region of interest, or the volume of interest, may be arranged in a region of the nozzle. For example, the volume of interest may be the end volume of the nozzle, a content of which is ejected from the nozzle with the next drop in the next on-demand-dispensing operation.

The information sensed by the sensor 52, for example, may be information with respect to the number, the size, the position, the type, the color and any other characteristic of the particles/cells within the observation volume of the droplet generator. For example, the sensor 52 may be a camera delivering images of the observation volume with particles/cells contained therein so that characteristics of the particles/cells located in the observation volume may be derived using known image processing techniques, e.g., by comparison with known patterns and the like. For example, this may be carried out by a controller 54 coupled to the sensor 52, the sound source 48 and the drop-on-demand mechanism 50 in order to control the operation of the same. Furthermore, the controller 54 may be coupled to suction means 56 in order to control the same depending on the sensed information. For example, if it is sensed that no particle or no particle of a desired type is located in the observation volume 22, the suction means 56 may be operated by the controller 54 in order to suck off a corresponding drop, as illustrated by an arrow 58 in FIG. 3. However, if a particle or a particle of the desired type is located in the observation volume 22, the suction means 56 is not activated so that the corresponding drop is ejected onto a carrier 60, as indicated by an arrow 62 in FIG. 3. For example, the carrier 60 may be a microtiter plate or another means which enables a further processing of the dispensed drop with the particle contained therein. Thus, embodiments are configured to dispense a dispensed drop depending on the sensed information to a first position (carrier 60) or a second position (suction means 56). No further explanation is needed with respect to the fact that alternative possibilities may be provided in order to dispense drops to different positions, for example as described in WO 2011/154042 A1.

By this, for example, it may be possible to only eject drops solely containing exactly one particle, or one cell, onto the tray 60, while all other drops are sucked off by the suction means 56. For example, the suction means 56 may be connected to a waste container.

Furthermore, the controller 54 may be configured to control the sound source 48 in order to generate, in the fluid chamber 44, acoustic fields with different frequencies, e.g., in order to generate node lines of the pressure field, as described above with reference to FIGS. 2b and 2c.

Thus, embodiments of the present invention provide a system which may be used for dispensing, counting and characterizing particles, e.g., biological cells, in a liquid. In this case, the cell concentration in the liquid may be set so that the cells individually flow into the fluid chamber (dosage chamber), e.g., via an inlet chamber and an inlet. Without a focusing, the individually supplied particles would arbitrarily distribute in the chamber. By an acoustophoretic focusing, the particles may be aligned along a line directed towards the ejection nozzle. One particle each may then be dispensed using a drop generator, which may be, for example, a drop-on-demand direct volume impeller, wherein a certain liquid volume including the cell(s) contained therein is dispensed from the nozzle at each dispersion. By this, further particles may advance from a reservoir. A sound field may be coupled into the fluid chamber, i.e., the dosage chamber, of the dispenser by the sound source. The frequency may be selected such that a desired particle pattern results from a resonance. For example, all particles may be focused in the middle of the fluid chamber, while the nozzle may also be formed centrally in the wall limiting the fluid chamber at the front end with respect to the stream. An imaging optics may be used in order to recognize the position and number of the particles in the camera's field of view, the region of interest, so that an image processing algorithm, which is, for example, performed in the controller 54, may predict the particle number in the next drop.

Thus, embodiments of the invention are suited for printing individual cells or a specific number of cells. Other examples may refer to printing individual bacteria or other organisms or groups thereof. Even other examples may refer to printing individual oil drops in a suspension or groups of a specific number of oil drops. Furthermore, embodiments of the invention may also refer to printing individual artificial particles or groups of artificial particles in suspensions, e.g., beads, quantum dots and the like. Further embodiments may refer to a preselection of particles with an acoustical contrast in order to only dispense specific particles.

Regarding the technology which forms the basis of the acoustophoresis, for example, reference may be made to the above mentioned specification of I. Leibacher. As discussed above, in order align particles in a liquid in an arrangement, standing sound waves are generated in the liquid so that particles collect at nodes of the pressure field. A standing wave is generated by interference of an advancing wave and a reflected wave. The reflection is achieved by an impedance discontinuity at the transition of two materials. The acoustic impedance Z of a material results from its material density ρ and its sound speed c:

$$Z = \rho \cdot c.$$

For example, water and silicon, which may be used as materials, comprise the following characteristics:

| Material | Sound speed c | Density ρ | Characteristic acoustic impedance Z |
|---|---|---|---|
| Water | 1497 m/s | 998 kg/m$^3$ | 1.5 e6 Ns/m$^3$ |
| Silicon [110] | 9133 m/s | 2331 kg/m$^3$ | 21.3 e6 Ns/m$^3$ |

The reflection coefficient R and the transmission coefficient T give the proportion of the wave intensity which is reflected or transmitted at an impedance discontinuity:

$$R_I = \left(\frac{Z_2 - Z_1}{Z_2 + Z_1}\right)^2, \quad T_I = \frac{4Z_1 Z_2}{(Z_1 + Z_2)^2}$$

$R_I + T_I = 100\%$

The following applies for the interface water/silicon:

$$\text{Water/silicon} \rightarrow R_I = 75\%, T_I = 25\%$$

Thus, 75% of the wave intensity is reflected at a silicon wall limiting a water channel so that a resonance may be created.

Obviously, the above mentioned materials are only exemplary and embodiments of the invention may be implemented using other materials with different acoustic impedances as long as a generation of a corresponding acoustic field is possible.

Thus, embodiments of the invention provide apparatuses and methods for dispensing (printing, dosing) particles and cells, comprising a drop-on-demand mechanism for dispensing individual drops, a sound source generating an acoustic field in the dispensing unit so that particles or cells are supplied to the sensing region in an orderly manner, and a recognition mechanism for recognizing individual or several particles or cells before dispensing.

In embodiments, depending on the channel geometry of the dispenser, it may be switched between different particle arrangements irrespective of the fluid movement, as needed. With sufficient energy coupled into, the sound source may be attached at a freely selectable position. A control unit may select the excitation frequency in response to the usage case. For example, the excitation frequency may correspond to a resonance frequency of a field transverse to the stream direction, or may correspond to a resonance frequency of a field in parallel to the stream direction. Alternatively, an excitation frequency may be any combination of such frequencies.

Thus, embodiments of the present invention provide a possibility to line up particles, or cells, in a liquid in the dispenser, in particular in a drop-on-demand dispenser. In embodiments of the invention, this is achieved by an acoustophoretic focusing. By the same, a force is applied to the particles in the liquid so that the particles may be moved relative to the liquid in order to achieve the corresponding arrangement. Thus, in embodiments, it is possible to hold back particles in a fluid chamber, while liquid drops are ejected without particles.

Typical dimensions of fluid structures, e.g., the fluid chamber and the nozzle, may be in the range of 1 µm to 1000 µm. Typical liquid volumes, e.g., of the ejected droplets, may be in a range of one picoliter to one microliter. Imaging sensors may be used as particle sensors, as described. Alternatively, fluorescence-measuring sensors or other optical sensors (e.g., Raman spectroscopy), electrical sensors or mechanical sensors may be used. In general, any sensor may be used which allows for sensing information with respect to a particle present in a region of interest.

Due to the acoustic arrangement of the particles, embodiments of the invention allow for an increased accuracy during the particle detection since sensor signals from the particle detection may become more uniform. In an imaging detection, a small image field, or a larger magnification, may be selected. Additionally, if the particle positon remains the same, the variability of the background may be reduced. If the arrangement of the particles has been selected such that the particles are not located at the edge of the liquid channel, or the fluid channel, detection errors by edge effects, e.g., shading, are still prevented. This may significantly decrease the particle loss, i.e., the number of non-detected particles. Furthermore, the detection or sampling rate may be increased in many sensor systems. This results from significantly reducing the measurement field, or the measurement volume (region of interest). Furthermore, the movement of the particles in the fluid is more predicable when their position is uniform. In particular, this has the advantage that the number of the particles in the next drop may be predicted with a higher reliability. Due to the smaller ROI, it is possible to improve the signal-to-noise ratio at a consistent particle size.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for dispensing particles in free-flying liquid drops, comprising:
    a fluid chamber fluidically coupled to a nozzle and comprising an inlet;
    a sound source configured to generate, in the fluid chamber, an acoustic field by which particles in a liquid in the fluid chamber may be aligned in an arrangement; and
    a drop-on-demand-dispenser to, at a selected point in time, selectively dispense from the nozzle an individual liquid drop comprising one or several particles,
    a controller coupled to the sound source and the drop-on-demand-dispenser, the controller being configured to control the sound source to switch between a first mode and a second mode,
    wherein, in the first mode, the sound source generates an acoustic field with a first frequency so that at least one particle is moved by the drop-on-demand-dispenser towards the nozzle in a step-by-step manner,
    wherein, in the second mode, the sound source generates an acoustic field with a second frequency so that a standing sound waves in parallel to a direction of liquid movement from the inlet towards the nozzle is generated by reflections at chamber walls of the fluid chamber which are opposite to each other in a direction of the liquid movement from the inlet towards the nozzle, so that at least one particle is held in the fluid chamber in spite of the liquid movement in the fluid chamber.

2. The apparatus according to claim 1, wherein, in the first mode, the particles are aligned along at least one line in parallel to the direction of liquid movement.

3. The apparatus according to claim 2, wherein the at least one line is aligned centrally in the fluid chamber towards the nozzle in parallel to the direction of liquid movement.

4. The apparatus according to claim 1, wherein chamber walls of the fluid chamber which are transversely opposite to the direction of liquid movement comprise a distance to each other corresponding to an integer multiple of half the wavelength of the first frequency.

5. The apparatus according to claim 1, wherein, in the second mode, the particles are aligned along at least one line perpendicular to the direction of liquid movement, wherein the chamber walls opposite in the direction of liquid movement comprise a distance to each other corresponding to an integer multiple of half the wavelength of the second frequency.

6. The apparatus according to claim 1, further comprising a sensor configured to sense information with regard to if a particle is arranged in a volume of interest dispensed from the nozzle with one of the next drops, wherein the sound source is configured to generate an acoustic field by which one of the particles is arranged in the volume of interest.

7. The apparatus according to claim 6, configured to dispense a dispensed drop to a first position or a second position depending on the sensed information.

8. The apparatus according to claim 1, wherein the fluid chamber is configured in a tapered manner both towards the nozzle and towards the inlet such that the walls of the fluid chamber which are opposite to each other in the direction of the liquid movement from the inlet towards the nozzle are formed.

9. A method for dispensing particles in free-flying liquid drops, comprising:
    generating an acoustic field in a fluid chamber comprising an inlet and fluidically coupled to a nozzle in order to align particles in a liquid in the fluid chamber in an arrangement; and
    applying a drop-on-demand-dispenser to, at a selected point in time, selectively dispense an individual drop from the nozzle in order to eject from the nozzle a free-flying liquid drop comprising one or several particles,
    by a controller coupled to the drop-on-demand-dispenser and a sound source, switching the sound between a first mode and a second mode, wherein, in the first mode, the sound source generates an acoustic field with a first frequency so that at least one particle is moved by the drop-on-demand-dispenser towards the nozzle in a step-by-step manner, and in the second mode, the sound source generates an acoustic field with a second frequency so that a standing sound wave in parallel to a direction of liquid movement from the inlet towards the nozzle is generated by reflections at chamber walls of the fluid chamber which are opposite to each other in a direction of a liquid movement towards the nozzle, so that at least one particle is held in the fluid chamber in spite of the liquid movement in the fluid chamber.

10. The method according to claim 9, wherein the particles are aligned and held along a line perpendicular to the direction of liquid movement while, by applying the drop-on-demand-dispenser a drop comprising no particle is ejected from the nozzle.

11. The method according to claim 9, further comprising sensing information with regard to if a particle is arranged in a volume of interest dispensed from the nozzle with one of the next drops, wherein one of the particles is arranged in the volume of interest by the acoustic field, and comprising dispensing a drop to a first position or a second position depending on the sensed information.

12. The method according to claim 9, wherein the fluid chamber is configured in a tapered manner both towards the nozzle and towards the inlet such that the walls of the fluid chamber which are opposite to each other in the direction of the liquid movement from the inlet towards the nozzle are formed.

* * * * *